(12) United States Patent
Liao et al.

(10) Patent No.: US 9,070,061 B2
(45) Date of Patent: Jun. 30, 2015

(54) METHOD AND SYSTEM FOR APPLYING AN ACTIVE RADIO FREQUENCY IDENTIFICATION (RFID) TAG HAVING A FIRST FILTER TO EXCLUDE INVALID SIGNALS AND A SECOND FILTER TO PERFORM A VALIDITY JUDGMENT

(75) Inventors: Jason Y. Liao, Chengdu (CN); Changzheng Sun, Xi'an (CN)

(73) Assignee: WESTVALLEY DIGITAL TECHNOLOGIES, INC., Chengdu, Sichuan (CN)

( * ) Notice: Subject to any disclaimer, the term of this patent is extended or adjusted under 35 U.S.C. 154(b) by 284 days.

(21) Appl. No.: 13/482,734

(22) Filed: May 29, 2012

(65) Prior Publication Data

US 2012/0235795 A1    Sep. 20, 2012

Related U.S. Application Data

(63) Continuation of application No. PCT/CN2009/075227, filed on Nov. 30, 2009.

(51) Int. Cl.
*G08B 21/00*  (2006.01)
*G06K 19/07*  (2006.01)

(52) U.S. Cl.
CPC ................................. *G06K 19/0723* (2013.01)

(58) Field of Classification Search
CPC ... G06K 19/0723; G06K 7/0008; H04L 67/12
USPC ................................................ 455/41.1, 41.2
See application file for complete search history.

(56) References Cited

U.S. PATENT DOCUMENTS

| | | | |
|---|---|---|---|
| 6,760,578 B2* | 7/2004 | Rotzoll ...................... | 455/343.2 |
| 2003/0214389 A1* | 11/2003 | Arneson et al. ............. | 340/10.1 |
| 2004/0132406 A1* | 7/2004 | Scott et al. ................... | 455/41.1 |
| 2005/0057368 A1* | 3/2005 | Corbett et al. ........... | 340/825.49 |
| 2008/0009257 A1* | 1/2008 | Safarian et al. .............. | 455/307 |
| 2008/0204193 A1* | 8/2008 | Zai et al. ..................... | 340/10.1 |

FOREIGN PATENT DOCUMENTS

| | | | |
|---|---|---|---|
| CN | 101059832 A | 10/2007 | |
| CN | 101236611 A | 8/2008 | |
| CN | 101533480 A | 9/2009 | |
| CN | 101582122 A | 11/2009 | |

* cited by examiner

*Primary Examiner* — Mark Rushing
(74) *Attorney, Agent, or Firm* — Tim TingKang Xia, Esq.; Morris, Manning & Martin, LLP

(57) ABSTRACT

The present invention provides an active radio frequency identification (RFID) tag and an application system and method thereof. The system includes: a control processor; a coordinator; an active RFID tag, configured to perform an RF feature check first with very little time before spending more time to receive a whole valid data packet during the time period of an interception state; and a reader/writer. Therefore, the power consumption of an active RFID tag is reduced drastically. Further, the present invention also provides an active RFID tag having a plurality of fixed mode actions and the application system and method thereof, thereby improving the communication efficiency of the radio communication system and effectively reducing the probability of signal collision and mutual interference.

10 Claims, 8 Drawing Sheets

METHOD AND SYSTEM FOR APPLYING AN ACTIVE RADIO FREQUENCY IDENTIFICATION (RFID) TAG HAVING A FIRST FILTER TO EXCLUDE INVALID SIGNALS AND A SECOND FILTER TO PERFORM A VALIDITY JUDGMENT

CROSS-REFERENCE TO RELATED APPLICATIONS

This application is a continuation of International Patent Application No. PCT/CN2009/075227, with an international filing date of Nov. 30, 2009, designating the United States, now pending. The contents of the specification are incorporated herein by reference.

BACKGROUND OF THE INVENTION

1. Field of the Invention

The present invention relates to information transmission technologies, and in particular, to an active radio frequency identification (RFID) tag and an application system and method thereof.

2. Description of the Related Art

The existing active RFID tag mainly achieves long-distance identification and management for human being, objects, and vehicles. The basic working principles are: reading the ID of the active RFID tag installed on the target to be identified in radio frequency (RF) communication mode, and then invoking related information or data pre-stored the database of a control processor (for example, a computer) and corresponding to the ID to implement identification and management for a target. Therefore, application of such technology requires a connection to the related database of the control processor.

The current active RFID tag commonly works in a mode of initiatively and periodically transmitting its ID. To be specific, it is preset using an internal clock that the crystal oscillator and frequency synthesizer in the active RFID tag are started at a specific interval (for example, 1 second, 5 seconds or 10 minutes) and data packet information having a specific length is transmitted. For power saving, generally the short ID information is transmitted only, and then the active RFID tag enters the dormant state. In the dormant state, only the internal clock of the tag is running. This reduces the working time of the system and somehow prolongs the life cycle of the battery. However, this method also produces some problems, such as electromagnetic pollution to the environment, signal congestion and mutual interference, lack of working flexibility and adaptability.

The patent application No. 200710196801.X discloses an intelligent RFID tag system, using bidirectional communication, reducing electromagnetic pollution to the environment, signal congestion and mutual interference. However, when the active RFID tag, after periodical wakeup, identifies short signals transmitted by a semaphore, the active RFID tag performs software identification for a plurality of invalid received signals to determine whether theses signals are the desired short information. This, however, consumes a large amount of electric power of the active RFID tag.

After a low-frequency instruction signal is detected using a low-frequency detection circuit, the crystal oscillator and frequency synthesizer in a high-frequency transceiver are started to enable the high-frequency transceiver to enter the state of receiving and transmitting signals. Although the system consumes no electric power before the detection circuit detects the instruction signal, since the sensitivity of the low-frequency detection circuit is generally very low, the low-frequency detection circuit is capable of detecting signals within a short distance. It is still hard to increase the wakeup distance by improving the transmit power of the low-frequency signals. Consequently, the active RFID tag working in low-frequency detection circuit wakeup mode, achieves signal read and write only within a limited distance, is large in size, and lacks flexibility. Moreover, the system cost is high. As a result, the application of such type of active RFID tag is very limited.

To supplement the functions of the RFID tag, and enhance the flexibility, some active RFID tags adopt a method where the high-frequency and low-frequency communication systems work simultaneously. For example, two transceiver systems using a low frequency of 125 kHz and a high frequency of 2.4 GHz; in some active RFID tags, two transceiver systems using an ultra wideband (UWB) and a high frequency of 2.4 GHz. In this way, the complexity and cost of the RFID tag are increased, and the functions of the RFID tag is very limited.

The existing active RFID tag generally works in narrowband single frequency mode. In narrowband single frequency mode, the active RFID tag is easily subject to external interference. In addition, due to changes of the temperature, the working frequency of the crystal oscillator shifts out of aging, and in the actual application, the multipath effect and the Doppler effect may severely affect the reliability and stability of the system, especially in the industrial field with strong interference and in the scenario where the target to be identified is fast moving.

The existing active RFID tag is as what is stated in a recent document released (on March, July, and September 2009) by the IEEE Active RFID Tag International Standard Working Group: "Most active tags today in the market use a simplex (one-way) ID transmission scheme for the sole purpose of determining location in order to reduce their energy consumption and have no congestion control mechanism for high density reads. Active RFID tags require the ability to provide bidirectional communications as well as ranging, and congestion control for high density reads using ultra-low power. There are no international standards that meet this need."

With the proposal of the Internet of Things, people desire to make use of the advantages, such as simple structure, small size, low cost, and low power consumption, of the active RFID tag to address the issue during information transmission on the Internet of Things on how to establish a simple but reliable, cost-effective and low power consuming radio communication between people or objects and the public communication network within several meters to almost a thousand meters. This requires that the active RFID tag have the bidirectional communication capability adaptive to on demand working, more strong working adaptability and flexibility.

Further, with the proposal of the Internet of Things, people desire to make use of the advantages, such as simple structure, small size, low cost, and low power consumption, of the active RFID tag to address the issue during information transmission on the Internet of Things on how to establish a simple but reliable, cost-effective and low power consuming radio communication between people or objects and the public communication network within several meters to almost a thousand meters. Through such communication, identification information and state information (information of the tag and sensor) of related people and object may be quickly transmitted to a related control center. This presents a great challenge to the active RFID tag. Besides requirements of low power consumption, low cost, and working flexibility, it is also a critical issue on how to solve the problem of signal congestion. Although the bidirectional communication mode can be used to enable the active RFID tag to work on demand, during processing of mass tag information, it is obviously crucial to improve the air communication efficiency while reducing the time for air communication as much as possible. Especially, the information transmission on the Internet of Things is much more complex than the common identification application where only an ID is transmitted. During the information transmission on the Internet of Things, the two parties involved in the communication may need to repeat the transmission multiple times before completing a simple task; in addition, the more information transmitted each time, the high the probability of error and retransmission. This not only consumes more electric power, but also occupies more time of an air channel in the critical moment and place, thereby increasing congestion in the air communication and causing possible mutual interference. Therefore, it is important to shorten the time for air communication.

SUMMARY OF THE INVENTION

One objective of the present invention is to provide a bidirectional communication active RFID tag and a system and method for applying the same, thereby reducing the time required for the active RFID tag to receive and identify invalid signals. This is based on the principle, that in all wireless data communication, every bit of each data package transmitted between two transceivers in communication, must have specific RF features, such as frequency, modulation and coding pre-defined by the two parties. Any RF signals without such features are invalid signals, which are discarded immediately and not processed further. Only for those valid signals the active RFID tag takes more time to process.

To achieve the above objective, the present invention provides a system for applying an active RFID tag. The system includes: a control processor; a coordinator, configured to uninterruptedly and repeatedly transmit an instruction signal for a preset time period on a first channel; an active RFID tag, configured to receive the instruction signal during the time period of an interception state; and a reader/writer, connected to the control processor and configured to establish communication with the active RFID tag on a second channel after the active RFID tag receives the instruction signal on the first channel. The active RFID tag includes: a first filter module, configured to perform first filtering for signals received by the active RFID tag on the first channel to exclude invalid signals; and a second filter module, configured to perform a validity judgment based on digital information carried by the signal on the received signal having experienced first filtering to determine whether the received signal is the instruction signal for the tag based on digital information carried by the signal.

Further, if no signal has passed through the first filter module, the active RFID tag wastes no time to enter the dormant state and does not initiate second filtering to be performed by the second filter module.

The first filter module is a hard filter module, and filters the received signals based on the RF features; and the second filter module is a soft filter module and configured behind the first filter module, and performs the validity judgment based on digital information carried by the signal, such as whether the address code for receiving the received signal is correct.

The hard filter module includes a modulation filter submodule, where the modulation filter submodule demodulates the received signal, reads a received signal strength indication (RSSI) value of the demodulated signal, and refuses to perform subsequent processing for the received signal when the RSSI value is not larger than ambient noise; and the active RFID tag switches from the interception state to the dormant state in standby mode and will not initiate the second filtering process to be performed by the second filter module.

The hard filter module may include a decoding filter submodule, where the decoding filter submodule decodes the received signal, reads the decoded signal, and refuses to perform subsequent processing for the received signal when the decoded signal is a null signal or a garble signal; and the active RFID tag switches from the interception state to the dormant state in standby mode.

The coordinator works under the control of the control processor, or the coordinator works independently according to a preset process.

The coordinator and the reader/writer can be integrated in one module.

In addition, the present invention also provides a method for applying an active RFID tag. The method includes: step S502: uninterruptedly and repeatedly transmitting, by a coordinator, an instruction signal on a first channel; step S504: receiving, by an active RFID tag, the instruction signal during the time period of an interception state; and step S506: establishing, by a reader/writer, communication with the active RFID tag on a second channel. Step S504 further includes sub-step S5042: performing first filtering for signals received on the first channel to exclude the invalid signals; and step S504 further includes sub-step S5044: performing a validity judgment based on digital information carried by the signal on the received signal having experienced first filtering to determine whether the received signal is the instruction signal for the tag based on digital information carried by the signal.

Sub-step S5042 further includes: demodulating the received signal, reading an RSSI value of the demodulated signal, and refusing to perform subsequent processing for the received signal when the RSSI value is not larger than ambient noise; and switching, by the active RFID tag, from the interception state to the dormant state in standby mode.

Sub-step S5042 further includes: decoding the received signal, reading the decoded signal, and refusing to perform subsequent processing for the received signal when the decoded signal is a null signal or a garble signal; and switching, by the active RFID tag, from the interception state to the dormant state in standby mode.

In addition, the present invention provides an active RFID tag. The active RFID tag includes: a first filtering module, configured to perform first filtering for signals received by the active RFID tag on the first channel to exclude invalid signals; and a second filtering module, configured to perform a validity judgment based on digital information carried by the signal on the received signal having experienced first filtering to determine whether the received signal is the instruction signal for the tag based on digital information carried by the signal.

The first filter module is a hard filter module, and filters the received signals based on the RF features; and the second filter module is a soft filter module and configured behind the first filter module, and performs the validity judgment based on digital information carried by the signal, such as whether the address code for receiving the received signal is correct.

The hard filter module includes a modulation filter submodule, where the modulation filter submodule demodulates the received signal, reads an RSSI value of the demodulated signal, and refuses to perform subsequent processing for the received signal when the RSSI value is not larger than ambient noise; and the active RFID tag switches from the interception state to the dormant state in standby mode.

The hard filter module includes a decoding filter submodule, where the decoding filter submodule decodes the received signal, reads the decoded signal, and refuses to perform subsequent processing for the received signal when the decoded signal is a null signal or a garble signal; and the active RFID tag switches from the interception state to the dormant state in standby mode.

In addition, another objective of the present invention is to provide a bidirectional communication active RFID tag and a system and method for applying the same, so as to reduce the time required for air communication of the active RFID tag to mitigate signal congestion and effectively reduce the probability of signal collision and mutual interference.

To achieve the above object, the present invention provides a system for applying an active RFID tag. The system includes: a control processor; a coordinator, configured to uninterruptedly and repeatedly transmit a wakeup signal on a first channel; an active RFID tag, configured to receive the wakeup signal during the time period of an interception state; and a reader/writer, connected to the control processor, and configured to establish communication with the active RFID tag on a second channel after the active RFID tag receives the wakeup signal and transmit an action instruction index to the active RFID tag. The active RFID tag includes: an instruction receiving module, configured to receive the action instruction index from the reader/writer; a storing module, configured to store a preset index-action mapping relationship; and an action executing module, configured to search out the action instruction corresponding to the action instruction index from the index-action mapping relationship, and execute the action instruction.

The action instruction index includes an action code and the corresponding parameters, and the action instruction includes a control function.

The corresponding parameters include at least one of: signal transmission channel, signal transmission interval, transmit power, signal transmission times, sequence number of an element whose parameter is read by the active RFID tag, and sequence number of the reader/writer receiving the signal transmitted by the active RFID tag.

The coordinator works under the control of the control processor, or the coordinator works independently according to a preset process.

The coordinator and the reader/writer can be integrated in one module.

In addition, the present invention provides another system for applying an active RFID tag. The system includes: a control processor; a coordinator, configured to uninterruptedly and repeatedly transmit an instruction signal for a preset time period on a first channel, where the instruction signal includes an action instruction index; and an active RFID tag, configured to receive the instruction signal during the time period of an interception state and perform an operation in response to the action instruction index. The active RFID tag includes: an instruction receiving module, configured to receive the action instruction index from the coordinator; a storing module, configured to store a preset index-action mapping relationship; and an action executing module, configured to search out the action instruction corresponding to the action instruction index from the index-action mapping relationship, and execute the action instruction.

In addition, the present invention also provides a method for applying an RFID tag. The method includes: step S602: uninterruptedly and repeatedly transmitting, by a coordinator, a wakeup signal for a preset time period on a first channel; step S604: receiving, by an active RFID tag, the wakeup signal during the time period of an interception state; step S606: establishing, by a reader/writer, communication with the active RFID tag on a second channel, and transmitting an action instruction index to the active RFID tag; and step S608: receiving, by the active RFID tag, the action instruction index from the reader/writer, and searching out the action instruction corresponding to the action instruction index from a preset index-action mapping relationship and executing the action instruction.

The action instruction index includes an action code and a corresponding parameter, and the action instruction includes a control function.

The corresponding parameters include at least one of: signal transmission channel, signal transmission interval, transmit power, signal transmission times, sequence number of an element whose parameter is read by the active RFID tag, and sequence number of the reader/writer receiving the signal transmitted by the active RFID tag.

In addition, the present invention also provides an active RFID tag. The active RFID tag includes: an instruction receiving module, configured to receive the action instruction index from an external source; a storing module, configured to store a preset index-action mapping relationship; and an action executing module, configured to search out the action instruction corresponding to the action instruction index from the index-action mapping relationship, and execute the action instruction.

The action instruction index includes an action code and a corresponding parameter, and the action instruction includes a control function.

The corresponding parameters include at least one of: signal transmission channel, signal transmission interval, transmit power, signal transmission times, sequence number of an element whose parameter is read by the active RFID tag, and sequence number of the reader/writer receiving the signal transmitted by the active RFID tag.

According to one aspect of the present invention, using the simple hardware filtering method, and optimal hardware filtering method, the time period of the interception state of an active RFID tag thus can be reduced drastically, only enough to perform hardware filtering. Because there is very limited time that the valid RF signal is capable of coming in, and passing through the first filtering. Only when this happens, the active RFID tag will initiate the second filtering process and be capable of receiving the whole valid signal. and thus effectively achieving the objective of low power consumption of the active RFID tag. Further, the active RFID tag, based on bidirectional communication, is capable of working on demand and transmitting information within a long distance. In addition, the technical solution of the present invention is simple to implement, low in cost and achieves higher reliability.

Further, according to another aspect of the present invention, the program for executing a fixed mode operation is pre-stored in the active RFID tag, and the program is invoked and executed by transmitting the instruction signal with a greatly shortened length to the active RFID tag, thereby reducing the time required for air communication of the active RFID tag, improving the communication efficiency of the radio communication system, and mitigating signal congestion, and effectively lowering the probability of signal collision and mutual interference. Further, the active RFID tag, based on bidirectional communication, is capable of working on demand. In addition, the low-cost and low-power consumption active RFID tag generally used for identification is improved to a flexible multifunctional RFID tag capable of accommodating diversity of information transmission over the Internet of Things.

BRIEF DESCRIPTION OF THE DRAWINGS

Detailed description is given below in junction with accompanying drawings, in which.

DETAILED DESCRIPTION OF THE EMBODIMENTS

Various embodiments of the present invention provide an active RFID tag, and a system and method using the same. The following describes the technical solutions of the present invention in combination with accompanying drawings and embodiments.

First Embodiment

Figure 1:
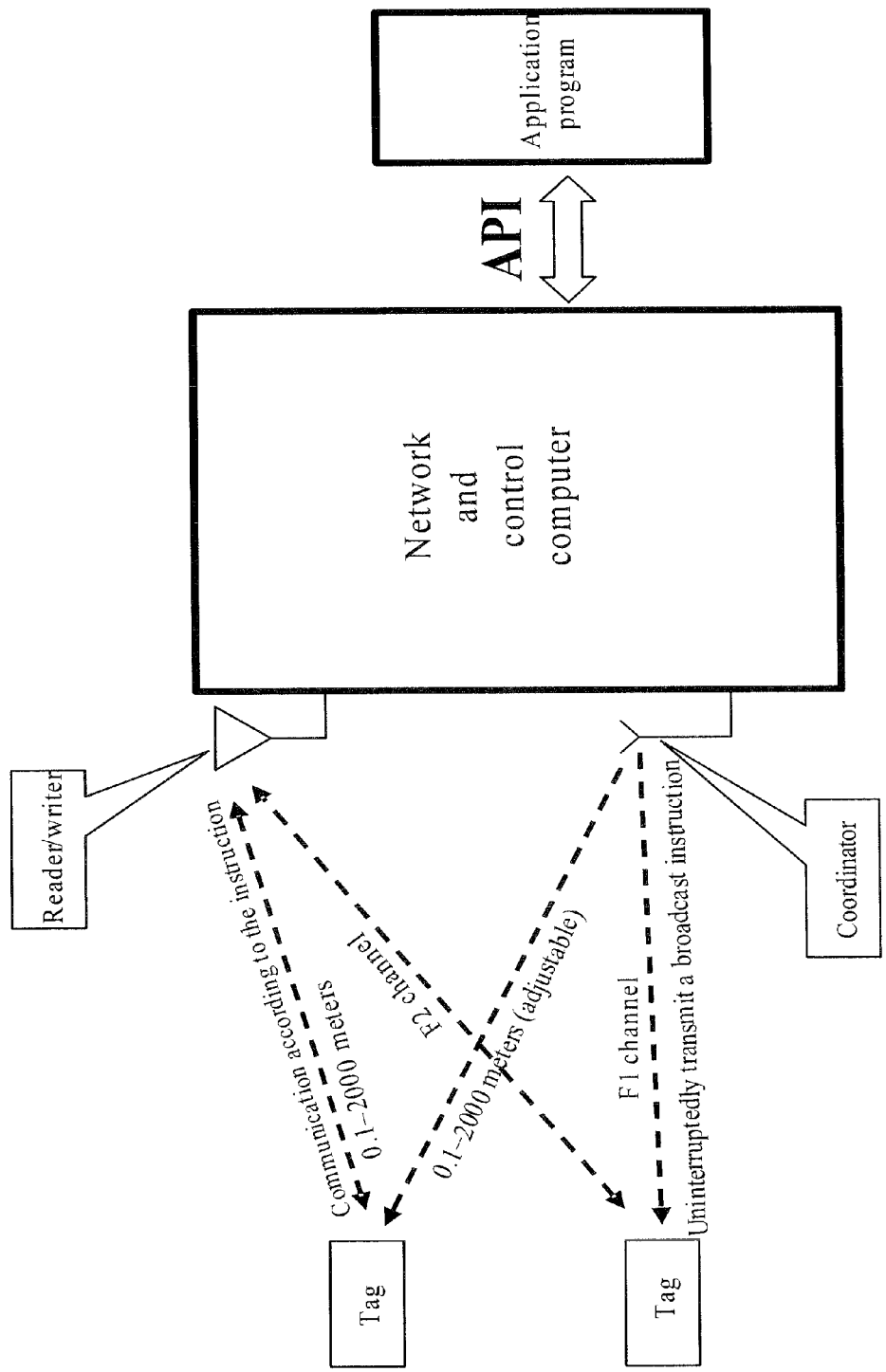
FIG. 1 is a schematic diagram of a system for applying an active RFID tag according to the present invention, where a coordinator is connected to a control processor (i.e., network and control computer in FIG. 1)
Figure 2:
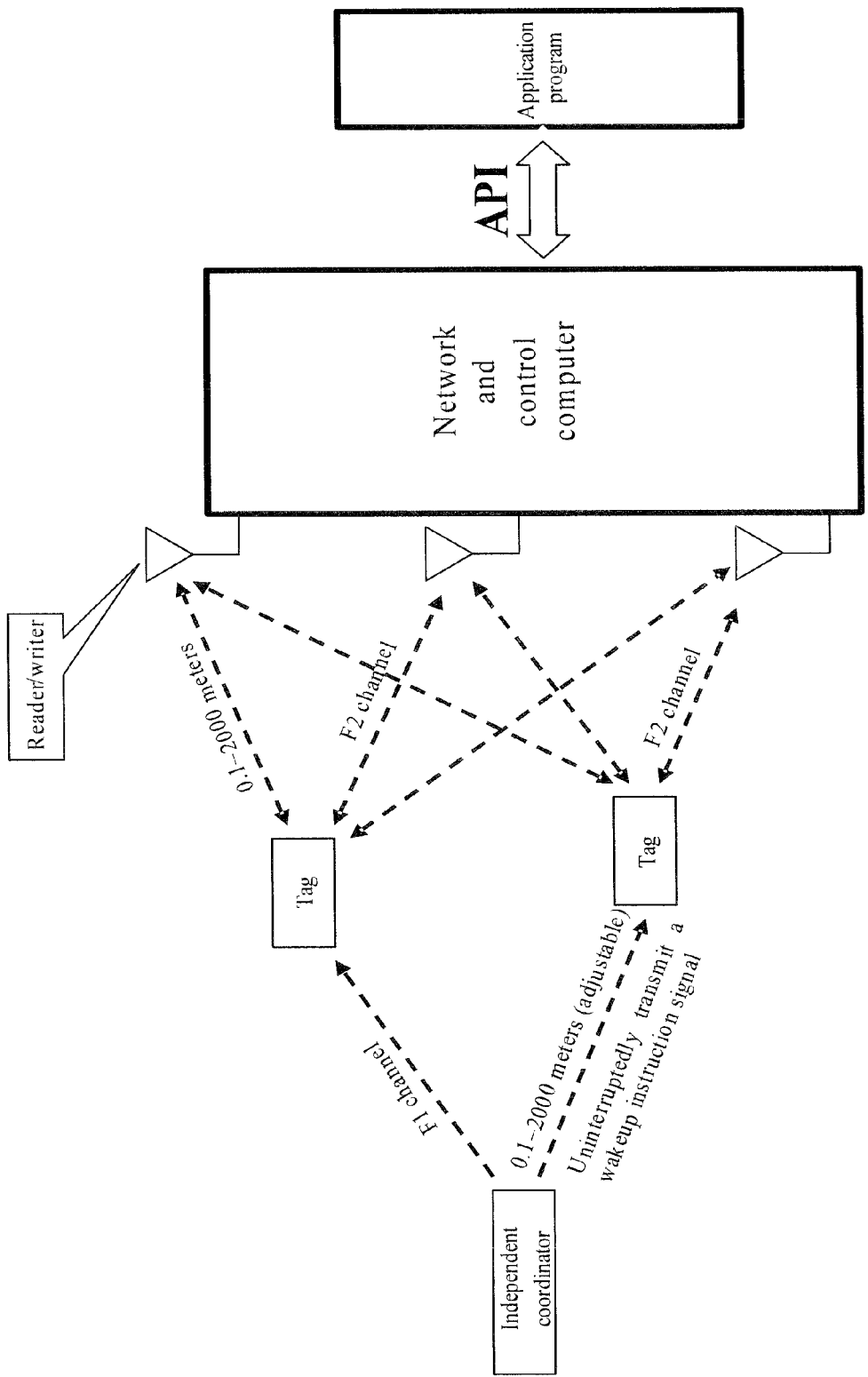
FIG. 2 is a schematic diagram of another system for applying an active RFID tag according to the present invention, where a coordinator is separated from a control processor (i.e., network and control computer in the FIG. 2)

Firstly, the first embodiment discloses a system for applying an active RFID tag. As shown in FIG. 1 and FIG. 2, the system includes: a control processor (i.e., the network and control computer shown in FIG. 1 and FIG. 2); a coordinator, configured to uninterruptedly and repeatedly transmit an instruction signal for a preset time period on a first channel; an active RFID tag, configured to receive the instruction signal during the time period of an interception state (the interception state shown in FIG. 3; when the active RFID tag, for saving the electric power, adopts the working mode where the periodical dormant mode is adopted, and the lower power consumption is intercepted by the active RFID tag in the instant of wakeup; the time period of the interception state refers to the instant for intercepting signals after the active RFID tag wakes up; the length of this time period depends on the time required for the active RFID tag to exclude the invalid signals or receive the valid signals); a reader/writer, connected to the control processor and configured to establish communication with the active RFID tag on a second channel after the active RFID tag receives the instruction signal on the first channel. When the active RFID tag processes the received signals, the frequency synthesizer and the crystal oscillator in the active RFID tag has been started and work in the stable state. The process of signal processing includes: a soft filter module (not shown), configured to determine whether the address code of the signal received on a first channel by an active RFID tag; and a hard filter module (not shown), configured to, before the signals are processed by the soft filter module, filter the received signals based on the RF features to exclude the invalid signals.

Further, this embodiment discloses another system for applying an active RFID tag. The system includes: a control processor (i.e., the network and control computer shown in FIG. 1 and FIG. 2); a coordinator, configured to uninterruptedly and repeatedly transmit an instruction signal for a preset time period on a first channel, where the instruction signal includes an action instruction; an active RFID tag, configured to receive the instruction signal during the time period (the interception state shown in FIG. 3) of an interception state and perform an operation in response to the action instruction. Preferably, the active RFID tag includes: a soft filter module (not shown), configured to determine whether the address code of the signal received on a first channel by an active RFID tag; and a hard filter module (not shown), configured to, before the signals are processed by the soft filter module, filter the received signals based on the RF features to exclude the invalid signals. In such a system, unidirectional communication from a control end (i.e., the coordinator) to the active RFID tag is only implemented. However, the active RFID tag, without exchanging with the reader/writer, is capable of receiving the instruction from the control end and executing the instruction, thereby simplifying the control process.

Further, this embodiment discloses a method for applying an active RFID tag. The method includes: step S502: uninterruptedly and repeatedly transmitting, by a coordinator under the control of a control processor, an instruction signal on a first channel; step S504: receiving, by an active RDID tag, the instruction signal during the time period of an interception state; and step S506: establishing, by a reader/writer, communication with the active RFID tag on a second channel. Step S504 further includes sub-step S5044: determining whether the address code of the signal received on the first channel by the active RFID tag is correct; and step S504 further includes sub-step S5042: before sub-step S5044, performing filtering for signals based on the RF features to exclude the invalid signals.

Further, this embodiment discloses an active RFID tag. The active RFID tag (shown in FIG. 1, and FIG. 2) includes: a soft filter module (not shown), configured to determine whether the address code of the signal received on a wakeup channel by an active RFID tag; and a hard filter module (not shown), configured to, before the signals are processed by the soft filter module, filter the received signals based on the RF features to exclude the invalid signals.

FIG. 1 is a schematic diagram of a system for applying an active RFID tag according to the present invention, where a coordinator is connected to a control processor. FIG. 2 is a schematic diagram of a system for applying an active RFID tag according to the present invention, where a coordinator is separated from a control processor.

As shown in FIG. 1 and FIG. 2, the system for applying an active RFID tag includes: a coordinator, a reader/writer, a tag (i.e., an active RFID tag), and a control processor (i.e., a network and control computer). The reader/writer is connected to the control processor, and the coordinator is connected (shown in FIG. 1) to or separated (shown in FIG. 2) from the control processor. The active RFID tag, the reader/writer, and the coordinator have the received signal strength indication (RSSI) function, respectively including a low-cost and low-power consumption micro-power single-chip radio transceiver and microcontroller controlling the transceiver, or including a low-cost and low-power consumption micro-power single chip having the functions of the transceiver and the microcontroller. The active RFID tag is capable of not only receiving the instruction signal from the coordinator, but also communicating with the reader/writer. In narrowband single frequency mode, the active RFID is easily subject to external interference. In addition, due to changes of the temperature, the working frequency of the crystal oscillator shifts out of aging, and in the actual application, the multipath effect and the Doppler effect may severely affect the reliability and stability of the system. To address these problems, it is recommended that the direct sequence spreading communication mode or another coding technology is used. In this way, the long-distance communication may be implemented, with an adjustable distance ranging between 0.1 to 2000 meters. The active RFID tag may use a battery for power supply, such as a Lithium battery, and is capable of switching between different channels, such as between a wakeup channel and a working channel. To enhance universality of the system, it is also recommended that universally used 2.4 GHz free frequency band or other frequency bands be used. In addition, various interfaces may be provided for connecting to the sensor as required. The control processor is a computer, microcontroller, or another intelligent device capable of implementing the control function and processing and storing the data.

In addition, the reader/writer may also implement the function of the coordinator so that the system does not require an independent coordinator. The reader/writer may work in the working mode of uninterruptedly and repeatedly transmitting the instruction signal on the wakeup channel for a period of time (the transmission time period needs to at least exceed the dormant period of the active RFID tag), and then switch to the working channel to communicate with the active RFID tag. If a microcontroller capable of carrying out the data processing and storing work same as the control processor, the reader/writer may further implement the function of the control processor so that the system does not require an independent coordinator. Therefore, the system may also be comprised of a reader/writer having the functions of the control processor, the coordinator, and the reader/writer simultaneously, and an active RFID tag; or comprised of a reader/writer having the functions of the coordinator and the reader/writer simultaneously, a control processor, and an active RFID tag.

Where and when the active RFID tag is required to perform a task, the control processor transmits an instruction or message to the coordinator in wired mode (shown in FIG. 1) or radio mode (shown in FIG. 2); and uninterruptedly and repeatedly transmits the instruction signal (shown in FIG. 3) to the active RFID tag on the wakeup channel (i.e., a first channel F1).

Figure 3:
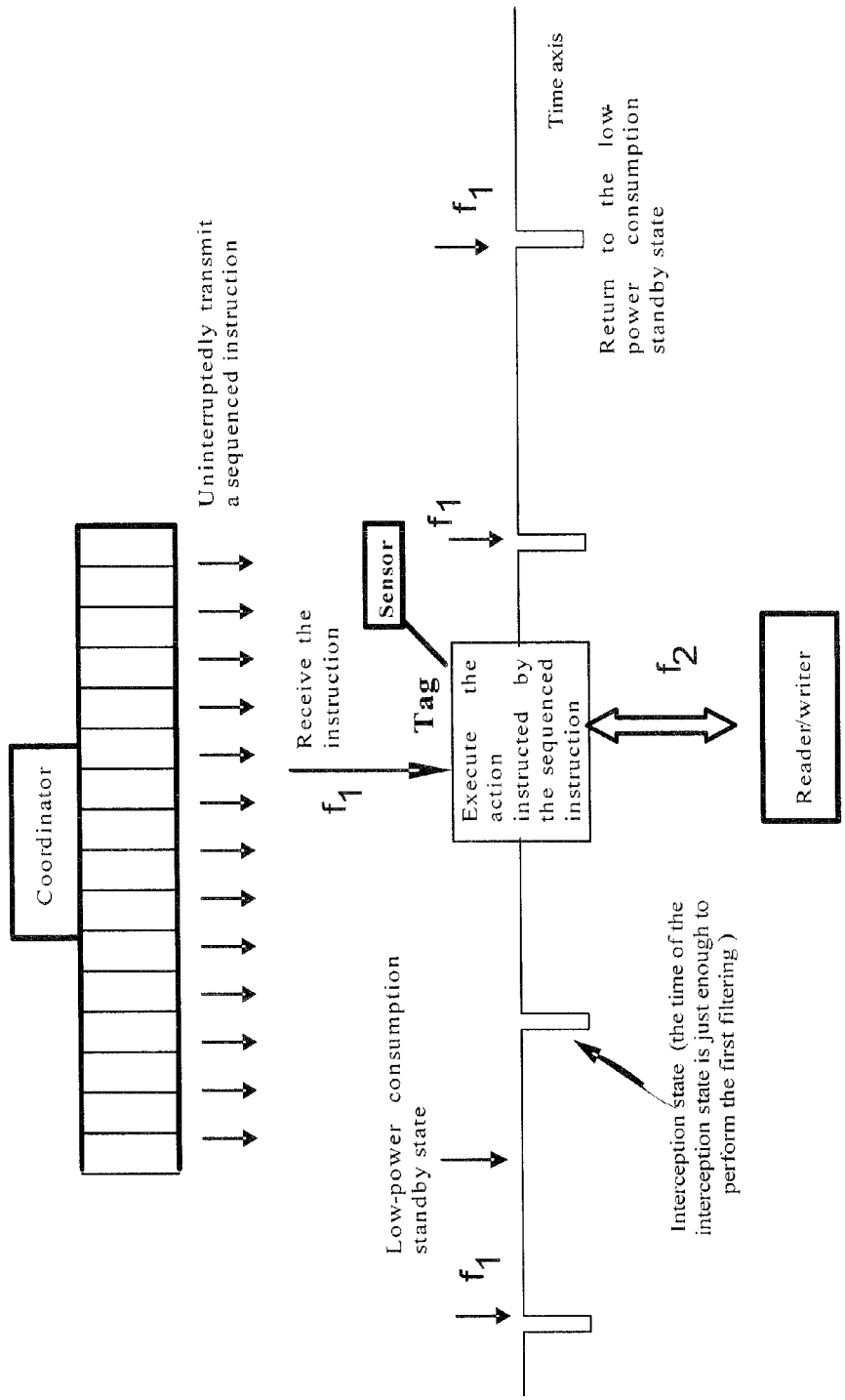
FIG. 3 is a schematic diagram of working state of an active RFID tag according to the present invention.
Figure 4:
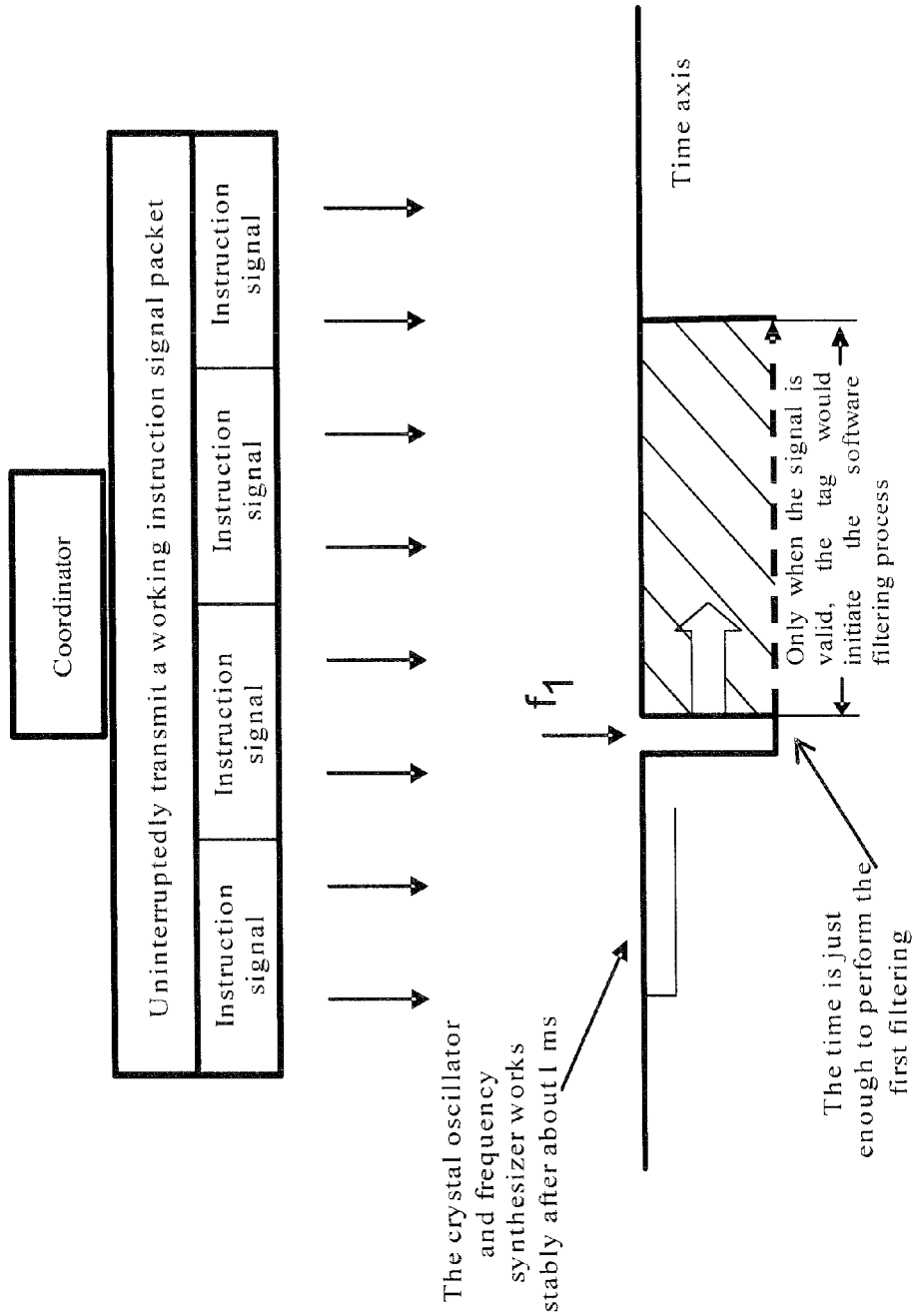
FIG. 4 is a schematic diagram of comparing the time required for filtering invalid signals by the active RFID tag using hardware and the time required for filtering invalid signals by the active RFID tag using software according to the present invention.

FIG. 3 is a schematic diagram of working state of an active RFID tag according to the present invention; and FIG. 4 is a schematic diagram of comparing the time required for filtering invalid signals by the active RFID tag using hardware and the time required for filtering invalid signals by the active RFID using software according to the present invention. As shown in FIG. 3, the active RFID tag stays in the standby state with low power consumption most of the time. It enters the working state for a short time period only after receiving a work instruction when and where it is required to work. After finishing a task, it quickly returns to the standby state. In the standby state, the active RFID tag periodically stays in the dormant state or interception state. When it is in the dormant state, the crystal oscillator and frequency synthesizer are all disabled, consuming less power. When it is in the interception state, the crystal oscillator and the frequency synthesizer are started. The instant low power consumption state when the active RFID tag periodically enters the dormant state and wakes up and intercepts signals on the first channel is called standby state, which is a basic state that the active RFID tag can maintain for a long time. When receiving the work instruction from the coordinator, the active RFID tag switches to the second channel and communicates with the reader/writer, or performs other operations according to commands, which is called the working state. This is a high power consumption state that the RFID tag can maintain for a short time period. However, in actual application, there is little time when the active RFID tag needs to work in the high-power consumption working state, which accounts for a little share in the total power consumption of the common active RFID tag. The major power consumption comes from periodically signal interception by the active RFID tag. To be specific, the shorter the time during which the active RFID tag intercepts the invalid signals each time after the active RFID tag wakes up, the smaller the working duty cycle in the standby state, and the less electric power is consumed. The working duty cycle refers to the ratio of the time for the active RFID tag to intercept the received signals within each dormant period to the dormant time plus the total time for intercepting the received signals.

As shown in FIG. 4, after the active RFID tag in the standby state stays in the dormant state for a period of time, the internal clock in the active RFID tag periodically starts the crystal oscillator and the frequency synthesizer to enable them to enter the signal interception state. After the received signals are determined to be the invalid signals by the hard filter module, the active RFID tag immediately enters the dormant state and waits for a next chance for signal interception after wakeup. This avoids the case where a large quantity of time is required for filtering the invalid signals by only relying on soft filtering for the address code (shown in FIG. 4). Only when the hard filtering fails to determine whether the received signals are invalid signals, the active RFID tag starts the soft filtering process, and continues to filter the signals until the signals are determined to be invalid signals and stops signal reception, or until the signals are determined valid signals and all received, and performs the actions according to the signal instruction. Or, if the instruction signal includes information requesting the multifunctional RFID tag to establish communication with the reader/writer, the active RFID tag switches to a working channel (i.e., a second channel F2) different from the wakeup channel to communicate with the reader/writer, execute the task issued by the control processor through the reader/writer, and transmits the obtained data to the reader/writer.

The reader/writer transmits the data obtained from the active RFID tag to the control processor, and the application program of the control processor processes the data.

If the control processes transmits an instruction signal by using the coordinator to only instruct the active RFID tag to transmit the data information, the control processor, after receiving the data from the active RFID tag by using the reader/writer, may transmit response information and instruct the coordinator to stop transmitting the instruction signal. The active RFID tag, after receiving the response information, switches to the dormant state in the low-power consumption standby state, and waits for a next chance for interception after wakeup.

Parameters of the active RFID tag, such as the working frequency, transmit power, receiver sensitivity, and standby-work period, may be modified by the coordinator or the reader/writer in radio mode, or modified by the control signal transmitted by the microcontroller of the active RFID tag in wired mode.

The following further describes the hardware filtering and software identification, and assesses power consumption in the hardware filtering method and the software identification method.

The exclusion of the invalid signals from the received signals using the hard filter module may be implemented by using a demodulation mode filter submodule or a decoding module filter module. The filtering of the invalid signals by the demodulation mode filter module is specifically as follows: the active RFID tag reads an RSSI value of the demodulated signal, stops signal reception when the RSSI value is not larger than ambient noise, switches to the low-power consumption state; otherwise, continues to receive the signal after the demodulation to further determine by software identification the signal after the demodulation to be the instruction signals. The filtering of the invalid signals by the decoding mode filter module is specifically as follows: the active RFID tag using frequency spreading or other coding technologies directly uses its own communication code to decode the signals, stops signal reception if the desired signal complying the communication code fails to be obtained, switches to the dormant state in the low-power consumption standby state, and waits for a next chance for signal interception after wakeup; otherwise, starts the software identification to further determine whether the signal is the instruction signal.

The simple hardware filtering method implements two-level filtering requiring the same frequency and modulation mode, but the optimal hardware filtering method needs to implement the three-level filtering requiring the same frequency, modulation mode, and coding mode. Therefore, the optimal hardware filtering method is capable of filtering out more invalid signals. The simple hardware filtering method is advantageous in that it is simple, less power-consuming than the pure software identification method, and widely supported by the hardware; and is disadvantageous in that when the RSSI value is determined by using the hardware, the RSSI value may fluctuate greatly, and generally the RSSI value needs to be read multiple times to calculate an average value, for example, an average value ranging about 100 µs. In addition, the signals not complying with the modulation mode are filtered out, and therefore the number of invalid signals failing to be filtered out is large and more time is spent in receiving the invalid signal. The optimal hardware filtering method is advantageous in that: the required time is short (only about 10 µs), and a longer distance of signal transmission is achieved because of the frequency spreading and coding gain; this identification mode implements finer filtering for the signals, and therefore except the valid signal, there are fewer invalid signals to be identified by the active RFID tag by using the software, and thus is less power-consuming. The optimal hardware filtering method is disadvantageous in that some of the current spreading transceiver chips do not provide the identification result externally.

Software identification refers to identifying the address code of the received signals by using the soft filter module. The received signals, before identification, have experienced two-level or even three-level filtering in frequency or modulation mode, or in additionally coding mode. According to the common signal receiving method, a complete data signal packet needs to be received. However, when the active RFID tag starts receiving a signal, the start position of the signal is missed. To receive a complete signal, the time for receiving the signal is at least twice that for receiving a complete instruction signal. Assume that a data packet is 16 bytes in length and the communication rate is 115.2 kbit/s, time more than 2 ms is generally required for receiving the packet. When it is determined, by identifying the address code of the signal using the software, that the received signal is an invalid signal, the signal reception may be immediately terminated. To be specific, the subsequent portion of the signal is not received, and the active RFID tag switches to the lower-power consumption standby state. Only when it is identified, by using the software, that the address code of the signal is correct, that is, the signal is the instruction signal, the subsequent portion of the signal is received continually. Inc conclusion, the time spent in intercepting the invalid signals is averagely half that spent in interception the valid signals. The software identification method is advantageous in that: the implementation is simple, and the method is capable of directly identifying the instruction signal; in addition, if the signal is a signal having experienced spreading or coding and has the spreading gain or coding gain, the signal may be transmitted within a longer distance. However, the software identification method has its disadvantage: a large number of invalid signals need to be received, and the time for receiving and identifying the signal is long, thereby increasing the power consumption.

The following uses simple calculation to estimate the power consumption in the case of the hardware filtering method and the software identification method respectively. To conclude a modest result, assume that the dormant interception period of the active RFID tag is 1 second, the frequency synthesizer and the crystal oscillator start and work stably within 1 ms, and the electric power consumption is 1 mA, each startup of the frequency synthesizer and the crystal oscillator consumes electric power of 1 µA.

Assume that the simple hardware filtering method is adopted, to conclude a modest calculation, after the frequency synthesizer and the crystal oscillator work stably, if the each interception (reception) lasts 100 µs, the current during interception is 25 mA, then the average electric power consumption in the standby state is 2.5 µA. Considering that delaying in intercepting the invalid signal consumes 10 µA electric power additionally, similarly assume that the active RFID tag works 10 times a day, each time produces a data volume of 2000 bytes and takes time of 250 ms, and the average working current is 24 mA, then the average electric power consumption is 7 µA, the dormant current is 5 µA, and the total electric power consumption is 24.5 µA. When a No. 5 Lithium battery having a capacity of 2300 mA is used, considering various factors, the available capacity is 2000 mA, and then the life cycle of an active RFID tag is 9.3 years. If the interception period is prolonged to 2 seconds, the life cycle of the battery may theoretically reach 12 years.

Assume that the optimal hardware filtering method is adopted, to conclude a modest calculation, after the frequency synthesizer and the crystal oscillator work stably, if the each interception lasts 20 µs, the current during interception is 25 mA, then the average current in the standby state is 0.5 µA. Considering that delaying in intercepting the invalid signal consumes 5 µA electric power additionally, similarly assume that the active RFID tag works 10 times a day, each time produces a data volume of 2000 bytes and takes time of 250 ms, and the average working current is 24 mA, then the average electric power consumption is 7 µA, the dormant current is 5 µA, and the total electric power consumption is 17.5 µA. When a No. 5 Lithium battery having a capacity of 2300 mA is used, considering various factors, the available capacity is 2000 mA, and then the theoretical life cycle of an active RFID tag is 13 years.

Through such comparison, it can be seen that when the invalid signals are filtered by using the hardware, the electric power consumed each time when the active RFID tag switches from the dormant state to the interception state to start signal interception is no longer a major factor determining the life cycle of the battery of the active RFID tag. Therefore, to improve the response speed of the active RFID tag to a working instruction, the dormant period of the active RFID tag may be further shorted once, from 1 second to 0.5 second.

When the simple hardware filtering method is adopted, assume the above assumptions are not changed, the electric power consumption (2 μA) of the frequency synthesizer and the crystal oscillator, the average electric power consumption (5 μA) in the standby state, the electric power (20 μA) consumed for signal interception are all increased once, and the total electric power consumption is 39 μA. In this case, the life cycle of the battery is 5 years.

When the optimal hardware filtering method is adopted, assume the above assumptions are not changed, the electric power consumption (2 μA) of the frequency synthesizer and the crystal oscillator, the standby current (1 μA), and the electric power (10 μA) consumed for signal interception are all increased once, and the total electric power consumption is 25 μA. In this case, the life cycle of the battery is 9 years.

Here the life cycle of the battery of an ultra long-distance active RFID tag (2000 meters) is calculated. The ultra long-distance active RFID tag is generally used for identifying ships and in the search and rescue work. Therefore, the average working time of such active RFID tag is far less than a short-distance active RFID tag (shorter than 100 meters). Assume that the active RFID tag works 4 times a day averagely, the communication volume produced in each time is 1000 received bytes (the working current is 25 mA), 1000 transmitted bytes (the working current is 200 mA), and each reception and transmission respectively takes 12 ms, then the average working current is 1.3 μA. The average working current is small as compared with other currents. Therefore, the average working current is not a major factor determining the life cycle of the battery of an active RFID tag. Obviously, the life cycle of the battery of an ultra long-distance active RFID tag sees no difference from that of the battery of a short-distance active RFID tag.

The ultra long-distance active RFID tag has another typical application scenario: volume transmission and temperature collection of the sensor: the current during signal transmission is 200 mA; assume that the ultra long-distance active RFID tag reports the temperature every 30 seconds, 16 bytes of data is transmitted, and 2 ms is took in each report, the response and instruction are intercepted once for 1 ms after each 5 reports, the interception current is 30 mA, and the dormant current of the active RFID tag 5 μA. The average working current is 18 μA, and therefore the life cycle of a No. 5 Lithium battery may reach 10 years.

Assume that the software filtering method is adopted, to conclude a modest calculation, after the frequency synthesizer and the crystal oscillator work stably, if the average time for each interception is 2 ms (including the invalid signal—3 ms, and invalid signal—1.5 ms), and the electric power consumed for signal interception is 25 mA, then the average standby current is 51 μA; further assume that the active RFID tag works 10 times a day, each time produces a data volume of 2000 bytes and takes time of 250 ms, and the average working current is 24 mA, then the average electric power consumption is 7 μA, the dormant current is 5 μA, and the total electric power consumption is 63 μA. When a No. 5 Lithium battery having a capacity of 2300 mA is used, considering various factors, the available capacity is 2000 mA, and then the life cycle of an active RFID tag is 3.6 years. If the dormant period is 2 seconds, the life cycle of the battery may reach 6 years. If the dormant period is adjusted to 8 seconds, the life cycle of the battery may theoretically reach over 10 years.

Therefore, the hardware filters out a large number of invalid signals, and the valid signal is identified using software identification. In this way, the working time of the active RFID tag is greatly reduced, that is, the working duty cycle is reduced so that the power consumption is greatly reduced.

As described above, using the hardware filtering method only fails to determine whether the received signals received by the active RFID tag are valid signals. However, the hardware filtering method is capable of excluding the majority of the invalid signals within a very short period of time (several microseconds), reducing the time spent by the active RFID tag in intercepting the invalid signals, and thereby greatly reducing the power consumption of the active RFID tag. In this way, the active RFID tag, based on the hardware signal filtering, uses the software filtering method, thereby basically reducing the power consumption of the active RFID tag.

After the hardware signal filtering method is used, the power consumption in the working state is not the major factor affecting the life cycle of the battery of the active RFID tag. The issue of prolonging the life cycle of the battery is transformed into reducing electricity leakage of the battery, which is relatively easy to resolve.

If the dormant current of the active RFID tag is further reduced, the working efficiency of the active RFID tag is further improved, and the dormant period is further prolonged, the ordinary Li—Mn button cell having low cost and small size may be used to drive the active RFID tag. This greatly enlarges the application scope of the active RFID tag.

The active RFID tag adopting the hardware filtering method is capable of implementing bidirectional communication and working on demand while lowering the power consumption. In addition, the technical solution is easy to implement, the cost is low, and the security is excellent, solving the problem of the existing RFID tag, such as electromagnetic pollution, signal congestion and mutual interference, lack of working flexibility and adaptability, and limited read-write distance.

Figure 5:
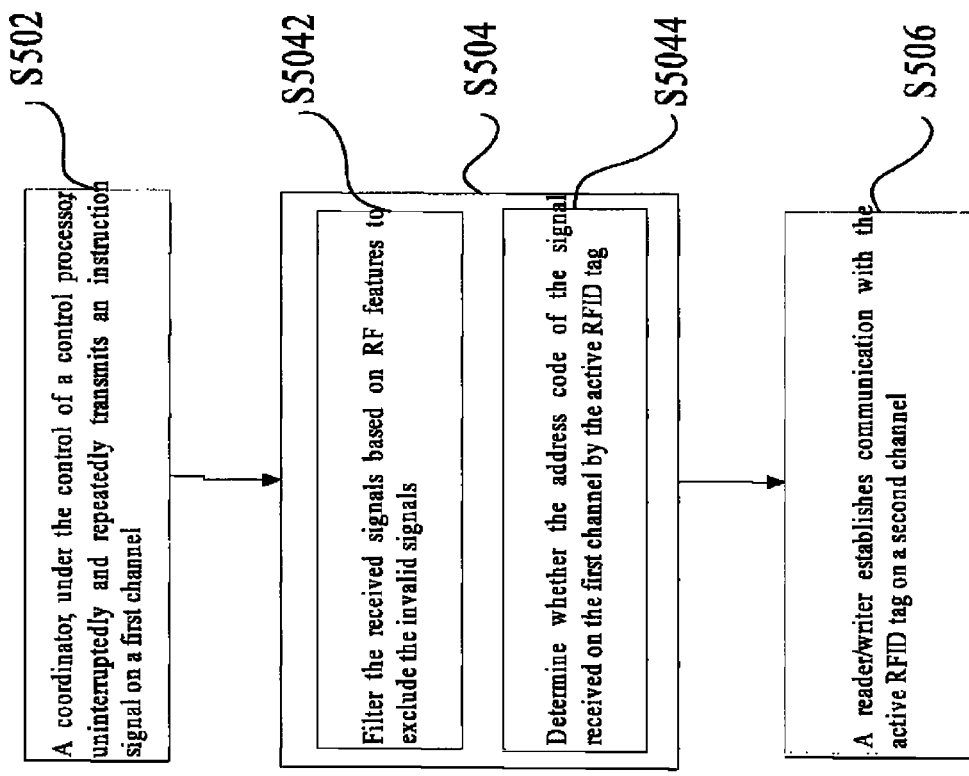
FIG. 5 is a flowchart of a method for applying an active RFID tag according to the present invention.
Figure 6:
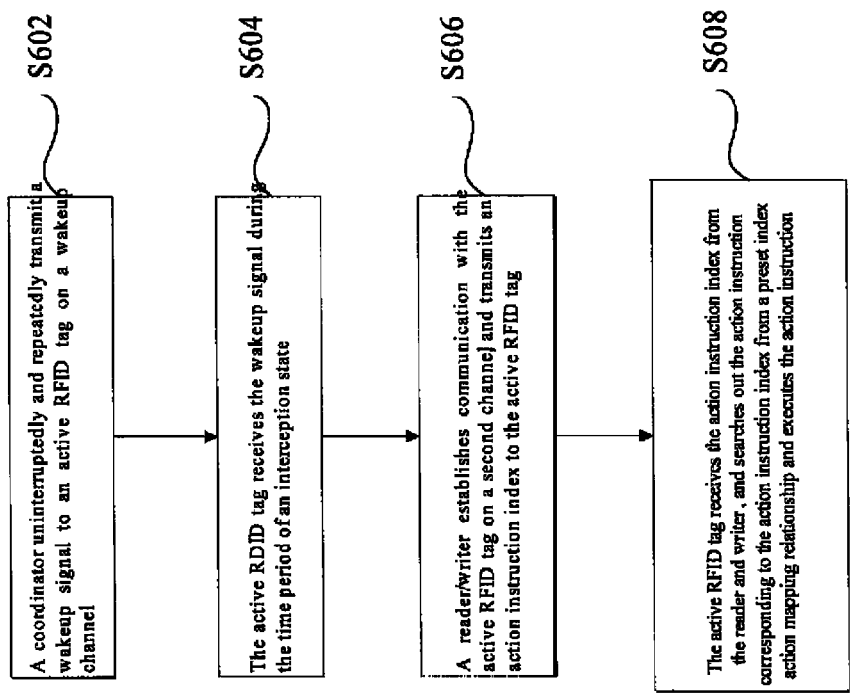
FIG. 6 is a flowchart of a method for applying an active RFID tag according to the present invention.

FIG. 5 is a flowchart of a method for applying an active RFID tag according to the present invention.

Step S502: A coordinator, under the control of a control processor, uninterruptedly and repeatedly transmits an instruction signal on a first channel.

Step S504: An active RFID tag receives the instruction signal on the first channel during the time period of an interception state. Step S504 includes:

Sub-step S5042: Filter the received signals based on the RF features to exclude the invalid signals. Specifically, with the simple hardware filtering method, an RSSI value of the demodulated signal is read, signal reception is immediately terminated when the RSSI value is not larger than ambient noise, and step S510 is performed; or with the optimal hardware filtering method, the active RFID tag using the spreading or other technologies directly uses its own communication code to decode the signal, signal reception is immediately terminated if the signal complying with the communication code fails to be obtained, and step S510 is performed.

The active RFID tag may be powered by a Lithium battery, and use the direct sequence spreading or other coding communication technologies, and universally used 2.4 GHz free frequency band or other frequency bands.

Sub-step S5044: Determine whether the address code of the signal received on the first channel by the active RFID tag. When it is determined that the address code is incorrect, signal reception is immediately terminated and step S510 is performed.

Step S506: A reader/writer establishes communication with the active RFID tag on a second channel, and transmits the data obtained from the active RFID tag to the control processor.

Step S508: If the control processor transmits the instruction signal by using the coordinator only to instruct the active RFID tag to transmit the data information, the control processor, the control processor, after receiving the data from the active RFID tag by using the reader/writer, transmits response information to the active RFID tag; after receiving the response information, the active RFID tag performs step S510.

Step S510: Enter the low-consumption standby state.

The following further describes the application of the above RFID tag with reference to an embodiment.

The active RFID tag may be applied to attendance management of buses, and an active RFID tag may be mounted on each bus. Each active RFID tag has a unique ID corresponding to the license plate number. The active RFID tag stays in the state of periodically intercepting signals on the wakeup channel. A coordinator connected to the infrared detector or an induction coil is deployed at each bus station. When the infrared sensor or the induction coil detects that a bus has stopped at the bus station, the coordinator is started to uninterruptedly transmit instruction information within 2 seconds at an interval of 5 to 10 seconds, instructing the active RFID tag to store the ID of the station and the current time. If during two consecutive minutes, the reader/writer installed at the station receives no signal, the coordinator stops transmitting the instruction signal until a new bus enters the station and the coordinator is restarted. After receiving the instruction signal, the active RFID tag records, according to the instruction, the station ID and the time when the bus stops at the station. The active RFID tag does not store two same station IDs, but stores two time point under the same station ID, i.e., earliest time and latest time for calculating the total time during which the bus stays at the station. When the bus reaches the destination station, the coordinator deployed at the entrance at the destination station senses, using the infrared detector or the induction coil, that a bus has returned, and the coordinator is started to uninterruptedly transmit an instruction instructing the active RFID tag to transmit its recorded information to the reader/writer connected to a management computer by using the working channel of the reader/writer. After receiving the recorded information of the bus, the management computer transmits a response to the active RFID tag on the working channel. After receiving the response, the active RFID tag returns to the standby state of intercepting signals and does not receive any signal temporarily. Meanwhile, the computer also instructs the coordinator to stop working until another bus comes to the station.

The management computer at the destination station is capable of collecting information required for management, such as running time, off-running time, specific running line of each bus, each station the bus stop each bus every day, and the duration of each stop every day. If a reader/writer connected to the general packet radio service (GPRS) module is further mounted on each bus, the entire system is also capable of implement real-time positioning of all the buses.

Second Embodiment

Figure 7:
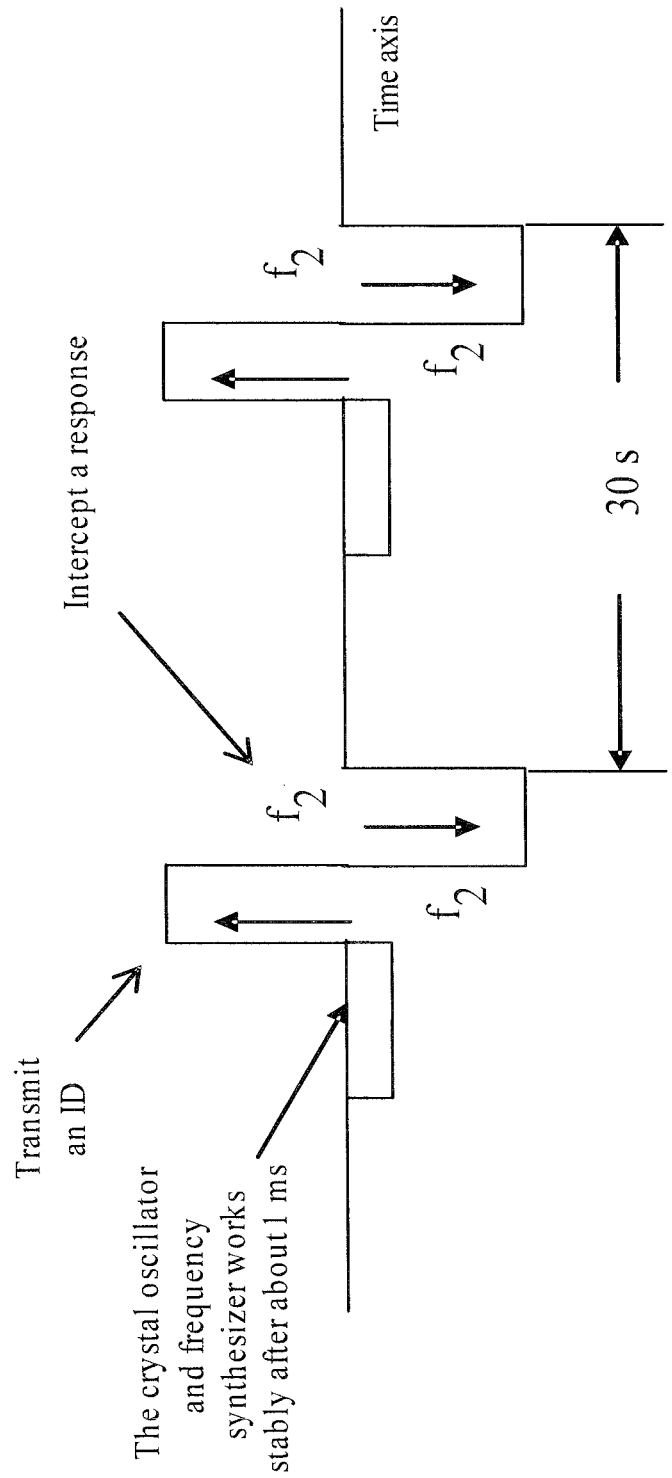
FIG. 7 is a schematic diagram of periodically transmitting signals and interception responses by the active RFID tag according to the present invention.
Figure 8:
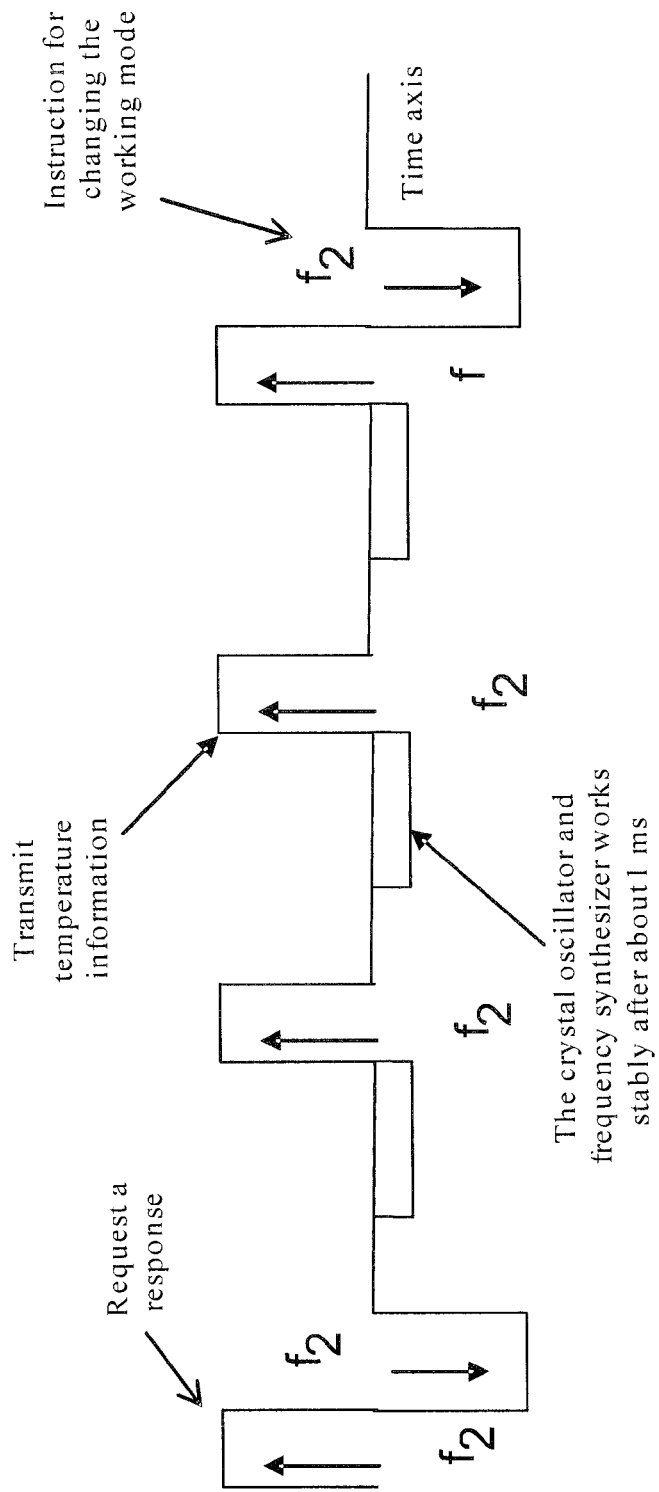
FIG. 8 is a schematic diagram of periodically transmitting signals multiple times and interception responses once by the active RFID tag according to the present invention.

The following further describes the present invention according to FIG. 5 in combination with FIG. 7 and FIG. 8.

Step S602: A coordinator, independently or under the control of a control processor, uninterruptedly and repeatedly transmits a wakeup signal on a wakeup channel. Step S604: An active RFID tag receives the wakeup signal during the time period of an interception state. Step S606: A reader/writer establishes communication with the active RFID tag on a second channel. Step S608: The active RFID tag receives the action instruction index from the reader/writer, and searches out the action instruction corresponding to the action instruction index from a preset index-action mapping relationship and executes the action instruction.

The wakeup signal includes information such as an address code, the sequence number of a task, and parameters of the task. The active RFID tag may identify the wakeup signal by using the address code, invoke (or query), by using the sequence number of the task, the program for executing a fixed mode operation corresponding to the sequence number and pre-stored in the active RFID tag, and assign a value to the program for executing a fixed mode operation corresponding to the sequence number by using the parameters.

The program for executing a fixed mode operation refers the program of a specific task executed by the active RFID tag. One or multiple programs (programs for executing a fixed mode operation) may be pre-stored in the active RFID tag, each corresponding to a sequence number. For example, three programs sequenced 1, 2, and 3 are pre-stored in the active RFID tag. The fixed mode operation executed by program 1 applicable to crossing-gate management is: transmitting the ID k times on the channel n using the transmit power P at the transmission interval of m seconds. The fixed mode operation executed by program 2 applicable to data collection of a sensor is: reading the data of the $L^{th}$ sensor, and transmitting the data on the channel n using the transmit power P in S communication mode to the $R^{th}$ receiver; the operation executed by program 3 is: transmitting the ID on the working channel, waiting for the response from the reader/writer for m microseconds, if no response, retransmitting the ID n times repeatedly until the response is received, establishing "dialog" communication with the reader/writer, and otherwise, returning to the low-power consumption standby state. When the active RFID tag is required to execute a task, only the sequence number and related parameters of the task need to be transmitted to the active RFID tag, for example, in the wakeup signal, input 1 in the location of the action sequence number, input 1 for the transmit interval, input 3 for channel, input 2 for the power, and input 3 for the transmit times, i.e., "1-1-3-2-20". This means that the system requires transmitting by the RFID tag the ID uninterruptedly 20 times on the channel 1 using the 3-level power at the interval of 1 second.

In addition, different from the fixed mode operation having a short execution time, the fixed mode operation may also execute a task lasting a long period of time and having low power consumption. Such case is applicable to a scenario where the transmission interval is long, and the requirement for the response time in response to a change of the working mode is not high, for example, a temperature monitoring system for city heating. The active RFID tag having a temperature sensor is preset, including setting the upper and lower limit values of the normal temperature, alarm action in the case of exceeding the limit value, interval for reporting the temperature in the case of normal temperature range and non-normal temperature. For example, when the temperature is normal, it is reported every 10 minutes; when the temperature is abnormal, it is reported every 10 seconds. These working parameters may be adjusted as required in radio mode. In such low-power consumption mode, the signal transmission interval is generally long and the signal duty cycle is very low. Therefore, even if the active RFID tag constantly transmits signals outward, problems such as the signal congestion generally produced by the active RFID tag will not occur.

In the wakeup instruction of the coordinator, if the sequence number of the program for executing a fixed mode operation is set by using one byte (8 bits), theoretically sequence numbers may be set for 256 programs for executing the fixed mode operations. Generally, according to the actual requirements of a specific project, one or several programs for executing the fixed mode operations satisfying the specific project are written into the active RFID tag. In the wakeup instruction, the byte used for setting the sequence number of the program for executing a fixed mode operation is followed closely by a byte used for setting the parameters corresponding to the fixed mode operation. For a program for executing a fixed mode operation, the types of the required parameters and the number of parameters are definite. When the sequence number if determined, the types of the parameters and the number of parameters are also determined.

Use of prescriptive action working mode is because in the prior art, the coordinator needs to clearly specifies the specific task to be executed by the active RFID tag in the wakeup signal, or needs to use an instruction of "instructing the active RFID tag to establish dialog communication with the reader/writer" so that after the control processor, after the active RFID tag establishes communication with the reader/writer, instructs the reader/writer to issue the specific task to be executed. These two modes both require a long period of communication process. Therefore, the time when the air channel is occupied is long, and the problems such as signal congestion and mutual interface tend to occur. However, in prescriptive action mode, a short wakeup signal including the task sequence number and the corresponding parameters need to be transmitted, thereby greatly reducing the time required for air communication and improving the communication efficiency. Meanwhile, multiple different tasks may be executed, and multiple functions may be implemented, thereby enhancing the flexibility in applications.

The active RFID tag periodically stays in the dormant state or the interception state. When the active RFID tag switches from the dormant state to the interception state, the active RFID tag starts the crystal oscillator and the frequency synthesizer to receive the wakeup signal. When determining that the received signal is the wakeup signal by identify the address code using the software, the active RFID tag invokes, by using the sequence number of the task, the program in fixed operation mode corresponding to the sequence number and pre-stored in the active RFID tag, assigns a value to the program in fixed operation mode corresponding to the sequence number by using the parameters, and then executes the program (the program generally includes an operation of transmitting the obtained data to the reader/writer after the active RFID tag executes the program and switches to the working channel) or executes the program for executing the fixed mode operation during communication with the reader/writer on the working channel (during the execution process of the program, the active RFID tag generally transmits the obtained data to the reader/writer).

Further, as shown in FIG. 7 and FIG. 8, the reader/writer transmits the data obtained by the active RFID tag to the control processor for processing. The control processor, after receiving the data from the active RFID tag by using the reader/writer, transmits response information to the active RFID tag. After receiving the response information, the active RFID tag enters the low-power consumption standby state, or transforms to another preset fixed mode operation, or delays the instruction transmitted by the control processor by using the reader/writer, and then executes the corresponding transform action according to the instruction.

In addition, the active RFID tag may receive the response using multiple methods. For example, the method may be intercepting (receiving) the response each time after transmitting the data, where the data transmission may be periodically initiated. As shown in FIG. 7, each time after transmitting the ID, the active RFID tag intercepts whether there is response information coming from the reader/writer. Alternatively, the method may also be intercepting the response information once after transmitting the information multiple times. Such transmission is generally periodically initiated. As shown in FIG. 8, after five times of data transmissions, the response is intercepted once. To reduce the time for waiting the response, the active RFID tag may also use the automatic response function of the majority of single-chip radio transceivers. In this way, after receiving the automatic response information, the active RFID tag may further delay in receiving an instruction transmitted by the control processor by using the reader/writer. If the instruction is received, the active RFID tag executes the corresponding transform action according to the instruction.

Parameters of the active RFID tag, such as the working frequency, transmit power, receiver sensitivity, and standby-work period, may be modified by the coordinator or the reader/writer in radio mode, or modified by the control signal of the microcontroller of the active RFID tag.

The above are merely exemplary embodiments of the present invention. The scope of the present invention is not limited thereto. Variations or replacements are readily apparent to persons skilled in the prior art. Any modification, equivalent replacement, or improvement made without departing from the spirit and principle of the present invention should fall within the scope of the present invention.

What is claimed is:

1. A system for communicating with an active radio frequency identification (RFID) tag, comprising:
  a control processor;
  a coordinator, configured to uninterruptedly and repeatedly transmit an instruction signal for a preset time period on a first channel;
  an active RFID tag, configured to receive the instruction signal during a time period of an interception state; and
  a reader/writer, connected to the control processor and configured to establish communication with the active RFID tag on a second channel after the active RFID tag receives the instruction signal on the first channel;
  wherein the active RFID tag comprises:
  a first filter module, configured to perform a first filtering for a signal received by the active RFID tag on the first channel to exclude invalid signals; and
  a second filter module, configured to perform a second filtering of a validity judgment on the received signal having experienced first filtering to determine whether the received signal is the instruction signal for the active RFID tag based on digital information carried by the signal;
  wherein if no signal has passed through the first filter module, the active RFID tag wastes no time to enter a dormant state and does not initiate the second filtering to be performed by the second filter module;
  the first filter module is a hard filter module, and filters the received signals based on the RF features; and
  the second filter module is a soft filter module and configured behind the first filter module, and performs the validity judgment based on the digital information carried by the signal, wherein the validity judgment comprises judging whether an address code of the received signal is correct.

2. The system according to claim 1, wherein the hard filter module comprises a modulation mode filter submodule, wherein the modulation mode filter submodule demodulates the received signal, reads a received signal strength indication (RSSI) value of the demodulated signal, and refuses to perform subsequent processing for the received signal when the RSSI value is not larger than ambient noise; and the active RFID tag switches from the interception state to the dormant state in a standby mode.

3. The system according to claim 1, wherein the hard filter module comprises a decoding filter submodule, wherein the decoding filter submodule decodes the received signal, reads the decoded signal, and refuses to perform subsequent processing for the received signal when the decoded signal is a null signal or a garble signal; and the active RFID tag switches from the interception state to the dormant state in a standby mode.

4. The system according to claim 1, wherein the coordinator works under the control of the control processor, or the coordinator works independently according to a preset process; or the coordinator and the reader/writer are integrated in one module.

5. A method for communicating with an active radio frequency identification (RFID) tag, comprising:
   a step a: uninterruptedly and repeatedly transmitting, by a coordinator, an instruction signal on a first channel for a preset period of time;
   a step b: receiving, by an active RFID tag, the instruction signal during a time period of an interception state; and
   a step c: establishing, by a reader/writer, communication with the active RFID tag on a second channel after the active RFID tag receives the instruction signal on the first channel;
   wherein the step b further comprises a sub-step b1: performing, by the active RFID tag, a first filtering for signals received by the active RFID tag on the first channel to exclude invalid signals; and
   the step b further comprises sub-step b2: performing, by the active RFID tag, a second filtering of a validity judgment on a received signal having experienced first filtering to determine whether the received signal is the instruction signal for the tag based on digital information carried by the signal;
   wherein if no signal has passed through the active RFID tag, the method further comprises: no wasting, by the active RFID tag, time to enter a dormant state; and no initiating, by the active RFID tag, the second filtering;
   wherein the method further comprises:
   filtering, by the active RFID tag, the received signals based on the RF features; and
   performing, by the active RFID tag, the validity judgment based on digital information carried by the received signal, wherein the validity judgment comprises whether an address code of the received signal is correct.

6. The method according to claim 5, wherein the sub-step b1 further comprises:
   demodulating the received signal, reading a received signal strength indication (RSSI) value of the demodulated signal, and refusing to perform subsequent processing for the received signal when the RSSI value is not larger than ambient noise; and switching, by the active RFID tag, from the interception state to the dormant state in a standby mode.

7. The method according to claim 5, wherein the sub-step b1 further comprises decoding the received signal, reading the decoded signal, and refusing to perform subsequent processing for the received signal when the decoded signal is a null signal or a garble signal; and switching, by the active RFID tag, from the interception state to the dormant state in a standby mode.

8. An active radio frequency identification (RFID) tag, wherein, the active RFID tag communicates with a coordinator and a reader/writer, the coordinator is configured to uninterruptedly and repeatedly transmit an instruction signal for a preset time period on a first channel, and the active RFID tag comprises:
   a receiver, configured to receive the instruction signal during a time period of an interception state;
   wherein the reader/writer is configured to establish communication with the active RFID tag on a second channel after the active RFID tag receives the instruction signal on the first channel, and the active RFID tag further comprises:
   a first filtering module, configured to perform a first filtering for signals received by the active RFID tag on the first channel to exclude invalid signals based on RF features; and
   a second filtering module, configured to perform a second filtering of a validity judgment on a received signal having experienced first filtering to determine whether the received signal is the instruction signal for the tag based on digital information carried by the received signal;
   wherein if no signal has passed through the first filter module, the active RFID tag wastes no time to enter a dormant state and does not initiate the second filtering to be performed by the second filter module;
   wherein the first filtering module is a hard filtering module, and filters the received signals based on the RF features; and
   the second filter module is a soft filter module and configured behind the first filter module, and performs the validity judgment based on digital information carried by the received signal, wherein the validity judgment comprises judging whether an address code of the received signal is correct.

9. The active RFID tag according to claim 8, wherein the hard filter module comprises a modulation filter submodule, wherein the modulation filter submodule demodulates the received signal, reads a received signal strength indication (RSSI) value of the demodulated signal, and refuses to perform subsequent processing for the received signal when the RSSI value is not larger than ambient noise; and the active RFID tag switches from the interception state to the dormant state in a standby mode.

10. The active RFID tag according to claim 8, wherein the hard filter module comprises a decoding filter submodule, wherein the decoding filter submodule decodes the received signal, reads the decoded signal, and refuses to perform subsequent processing for the received signal when the decoded signal is a null signal or a garble signal; and the active RFID tag switches from the interception state to the dormant state in a standby mode.

* * * * *